J. H. GREENSTREET.
PAPER SHEET MATERIAL FOR BOXES.
APPLICATION FILED AUG. 9, 1915.
1,208,952.  Patented Dec. 19, 1916.
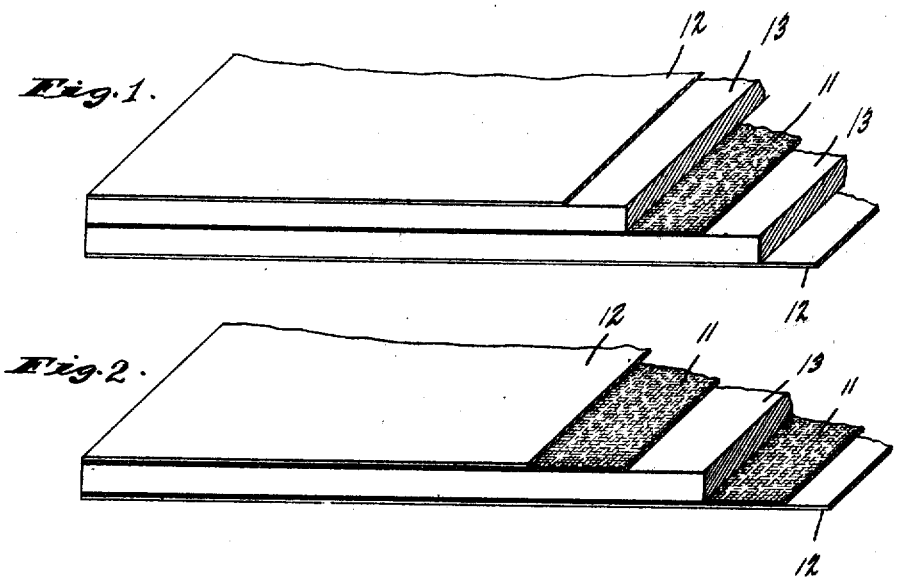
WITNESSES:
Frank A. Pahle
May Layden
INVENTOR
Jason H. Greenstreet,
BY
Hood & Schley.
ATTORNEYS

UNITED STATES PATENT OFFICE.

JASON H. GREENSTREET, OF INDIANAPOLIS, INDIANA.

PAPER SHEET MATERIAL FOR BOXES.

1,208,952.   Specification of Letters Patent.   Patented Dec. 19, 1916.

Application filed August 9, 1915. Serial No. 44,439.

*To all whom it may concern:*

Be it known that I, JASON H. GREENSTREET, a citizen of the United States, residing at Indianapolis, in the county of Marion and State of Indiana, have invented a new and useful Paper Sheet Material for Boxes, of which the following is a specification.

The object of my invention is to produce a cheap but efficient laminated material, especially designed for packing boxes of the foldable blank type.

The accompanying drawings illustrate my invention.

Figure 1 is a sectional diagram of one form of my invention embodying two layers of chipboard or similar material for the interior, and Fig. 2 a similar view showing the arrangement where a single central layer of chipboard is used.

In the production of material of the class described, the material should possess both the quality of rigidity and toughness.

In the constructions shown in Figs. 1 and 2, 13 indicates a layer or layers of chipboard or strawboard reinforced with cloth 11 and faced with jute 12. In Fig. 1 the cloth reinforcement 11 is placed between two layers of chipboard, while in Fig. 2 a single layer of chipboard is reinforced by two layers of cloth. In Fig. 1 the jute is laid upon the outer faces of the chipboard, while in Fig. 2 the jute is laid upon the outer faces of the cloth. The chipboard is rigid but fragile and the cloth adds materially to the toughness of the product, while the jute paper furnishes a smooth, tough facing which presents a satisfactory finish.

I claim as my invention:

1. A reinforced paperboard comprising an interior filler of chipboard, a reinforcing layer of cloth applied to the chipboard, and facing layers of jute paper.

2. A reinforced paperboard comprising an interior filler of chipboard, a reinforcing layer of cloth applied to each face of the chipboard, and facing layers of a tough paper.

In witness whereof, I have hereunto set my hand at Indianapolis, Indiana, this 4th day of August, A. D. one thousand nine hundred and fifteen.

JASON H. GREENSTREET.